(12) United States Patent
Kim et al.

(10) Patent No.: US 10,196,519 B2
(45) Date of Patent: Feb. 5, 2019

(54) THERMOPLASTIC RESIN COMPOSITION AND MOLDED PRODUCT COMPRISING SAME

(71) Applicant: LOTTE ADVANCED MATERIALS CO., LTD., Yeosu-si (KR)

(72) Inventors: Byeong Yeol Kim, Uiwang-si (KR); Yoen Kyoung Kim, Uiwang-si (KR); Dong Hyun Park, Uiwang-si (KR); Yeon Wook Chung, Uiwang-si (KR); Dong Hui Chu, Uiwang-si (KR); Young Chul Kwon, Uiwang-si (KR); Kang Yeol Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 67 days.

(21) Appl. No.: 15/528,177

(22) PCT Filed: Nov. 3, 2015

(86) PCT No.: PCT/KR2015/011694
§ 371 (c)(1),
(2) Date: May 19, 2017

(87) PCT Pub. No.: WO2016/080675
PCT Pub. Date: May 26, 2016

(65) Prior Publication Data
US 2017/0327688 A1    Nov. 16, 2017

(30) Foreign Application Priority Data

Nov. 21, 2014 (KR) .......... 10-2014-0163814
Oct. 28, 2015 (KR) .......... 10-2015-0150394

(51) Int. Cl.
| | |
|---|---|
| *C08L 83/06* | (2006.01) |
| *C08L 33/12* | (2006.01) |
| *C08L 55/02* | (2006.01) |
| *C08K 3/36* | (2006.01) |
| *C08G 77/14* | (2006.01) |
| *C08L 25/12* | (2006.01) |
| *C08L 33/04* | (2006.01) |

(52) U.S. Cl.
CPC .............. *C08L 83/06* (2013.01); *C08G 77/14* (2013.01); *C08K 3/36* (2013.01); *C08L 25/12* (2013.01); *C08L 33/04* (2013.01); *C08L 33/12* (2013.01); *C08L 55/02* (2013.01); *C08L 2205/03* (2013.01)

(58) Field of Classification Search
CPC .. C08L 83/06; C08L 33/12; C08L 3/36; C08L 55/02; C08K 3/36; C08G 77/14
USPC ........................................................... 524/265
See application file for complete search history.

(56) References Cited

U.S. PATENT DOCUMENTS

| | | | |
|---|---|---|---|
| 4,499,149 A * | 2/1985 | Berger .................. | C07F 7/0889 257/788 |
| 5,354,796 A | 10/1994 | Creecy et al. | |
| 6,153,680 A | 11/2000 | Shah et al. | |
| 6,593,403 B1 | 7/2003 | Dirk et al. | |
| 8,415,430 B2 | 4/2013 | Kuhn et al. | |
| 8,951,933 B2 * | 2/2015 | Hanada .................. | B32B 27/12 428/32.64 |
| 9,394,462 B2 * | 7/2016 | Hanada .................. | B32B 27/12 |
| 10,000,609 B2 * | 6/2018 | Hanada .................. | C08G 18/61 |
| 2009/0043038 A1 | 2/2009 | Rogunova et al. | |
| 2009/0253856 A1 | 10/2009 | Kim et al. | |
| 2011/0147681 A1 | 6/2011 | Evans et al. | |
| 2012/0231184 A1 * | 9/2012 | Hanada .................. | B32B 27/12 428/32.39 |
| 2013/0171896 A1 * | 7/2013 | Hanada .................. | C08G 18/61 442/59 |
| 2014/0364027 A1 * | 12/2014 | Hanada .................. | B32B 27/12 442/59 |
| 2015/0148465 A1 | 5/2015 | Chung et al. | |

FOREIGN PATENT DOCUMENTS

| | | |
|---|---|---|
| EP | 1085052 A2 | 3/2001 |
| EP | 2878621 A1 | 6/2015 |
| JP | 2003-147219 A | 5/2003 |
| KR | 10-0788736 B1 | 1/2008 |
| KR | 10-0814362 B1 | 3/2008 |
| KR | 10-2011-0014154 A | 2/2011 |
| WO | 2016/080675 A1 | 5/2016 |

OTHER PUBLICATIONS

Extended Search Report counterpart European Application No. 15861890.0 dated Jun. 5, 2018, pp. 1-6.
Office Action in counterpart Korean Application No. 10-2015-0150394 dated Jan. 8, 2018, pp. 1-5.
International Search Report in counterpart International Application No. PCT/KR2015/011694 dated Feb. 17, 2016, pp. 1-4.

* cited by examiner

*Primary Examiner* — Deve E Valdez
(74) *Attorney, Agent, or Firm* — Additon, Higgins & Pendleton, P.A.

(57) ABSTRACT

A thermoplastic resin composition of the present invention comprises: a thermoplastic resin comprising a (meth)acrylic resin and an aromatic vinyl-based resin; and a siloxane compound represented by the chemical formula 1. The thermoplastic resin composition has excellent scratch resistance, mar resistance, colorability, appearance characteristics and the like.

13 Claims, 2 Drawing Sheets

[FIG. 1]
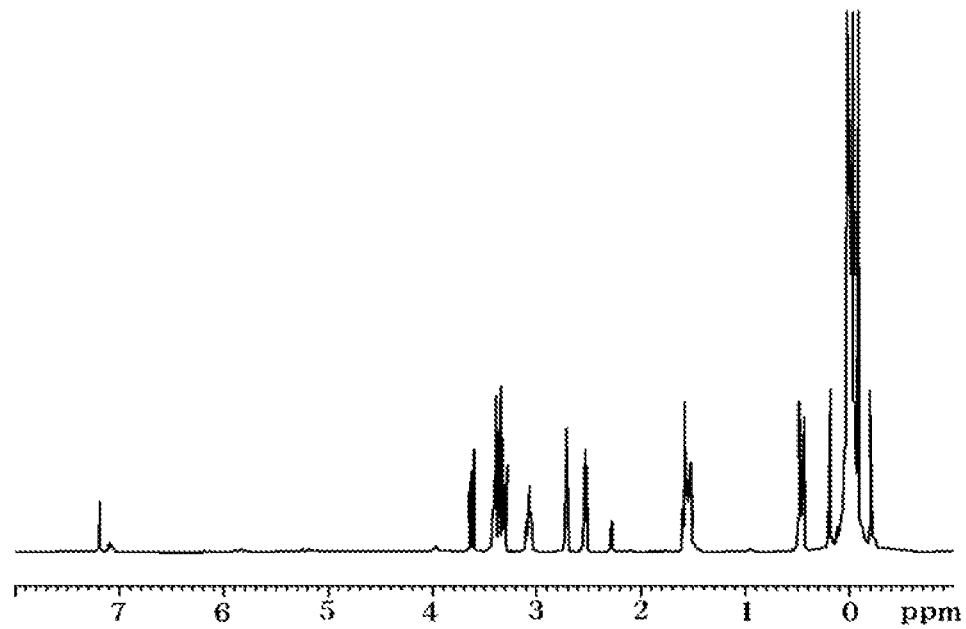
[FIG. 2]
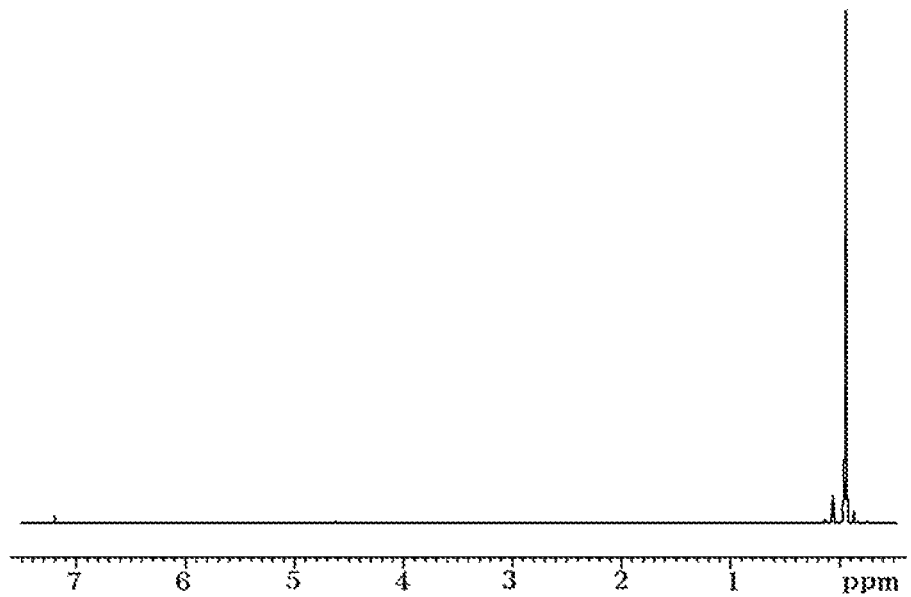

[FIG. 3]
[FIG. 4]
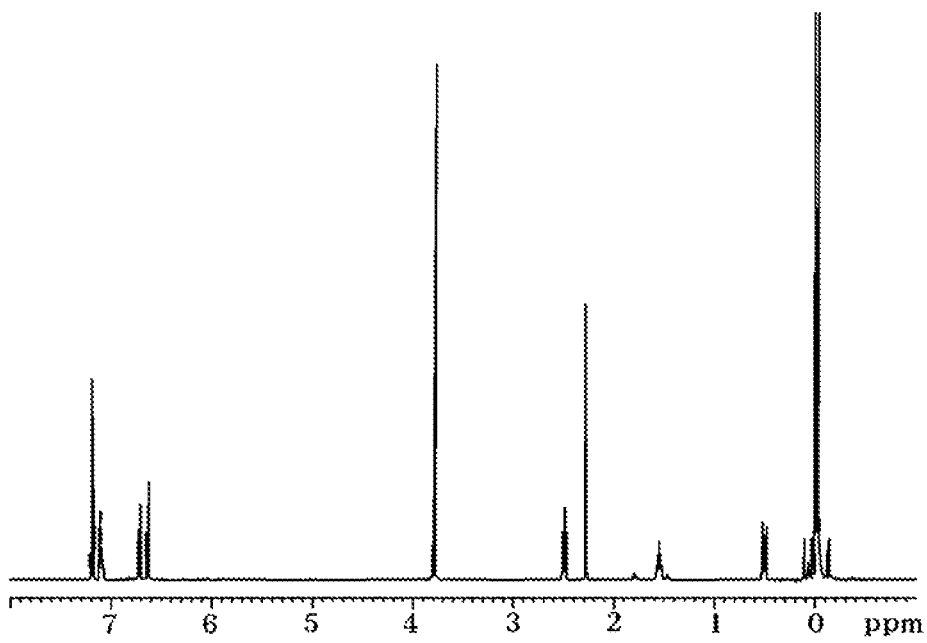

THERMOPLASTIC RESIN COMPOSITION AND MOLDED PRODUCT COMPRISING SAME

CROSS-REFERENCE TO RELATED APPLICATIONS

This application claims priority to and the benefit of International Application No. PCT/KR2015/011694, filed Nov. 3, 2015, which published as WO 2016/080675 on May 26, 2016; Korean Patent Application No. 10-2014-0163814, filed in the Korean Intellectual Property Office on Nov. 21, 2014; and Korean Patent Application No. 10-2015-0150394, filed in the Korean Intellectual Property Office on Oct. 28, 2015, the entire disclosure of each of which is incorporated herein by reference.

TECHNICAL FIELD

The present invention relates to a thermoplastic resin composition and a molded product comprising the same. More specifically, the present invention relates to a thermoplastic resin composition exhibiting good properties in terms of scratch resistance, mar resistance, colorability, external appearance, and the like, and a molded product comprising the same.

BACKGROUND ART

Thermoplastic resin compositions have good properties in terms of mechanical strength, thermal resistance, transparency, and the like, and are broadly applied to exterior materials such as electric/electronic products, mobile devices, office automation (OA) equipment, automotive housings, and the like. Typically, products (exterior materials and the like) produced from a thermoplastic resin composition are unlikely to realize good external appearance, high gloss, and the like. Thus, such products realize good external appearance and high gloss through additional materials and processes such as painting, coating, and the like. For example, a coating method such as silicone and vinyl compound coating, acrylic/melamine clear coating, and the like, and a method of adding additives such as slip additives, waxes, inorganic fillers, nanoparticles, and the like can be used. However, these methods can cause deterioration in other properties, such as color difference, impact resistance, thermal resistance, and the like.

Typically, coating (painting) with respect to an exterior material includes at least three processes including priming an exterior material, base forming, and painting. Increase in the number of processes can cause increase in defect rate, deterioration in productivity, and price increase. Moreover, since the painting process using an organic solvent generates a large amount of carbon dioxide which is a typical toxic component, various endeavors are continued to overcome this problem.

In order to address the problem of the painting process, non-painted materials have been developed in the art. In order to be applied as a non-painted material, a material must be able to realize appearance characteristics such as high-gloss texture and must have properties such as excellent scratch resistance and impact resistance. However, non-painted resins (materials) currently developed in the art do not satisfy all physical properties, such as colorability (color rendering property), impact resistance, thermal resistance, and scratch resistance. In addition, since the material has low mar resistance, there is a limit in application to high-gloss and high impact resistance products.

Therefore, there is a need for development of a thermoplastic resin composition that exhibits good properties in terms of scratch resistance, mar resistance, colorability, and appearance characteristics without deterioration in impact resistance, thermal resistance, and the like.

One example of the related art is disclosed in Korean Patent No. 10-0788736.

DISCLOSURE

Technical Problem

It is an object of the present invention to provide a thermoplastic resin composition having good properties in terms of scratch resistance, mar resistance, colorability, and appearance characteristics, and a molded product comprising the same.

The above and other objects of the present invention can be achieved by the present invention described below.

Technical Solution

One aspect of the present invention relates to a thermoplastic resin composition. The thermoplastic resin composition includes a thermoplastic resin including a (meth)acrylic resin and an aromatic vinyl resin; and a siloxane compound represented by Formula 1:

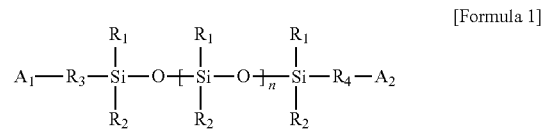

[Formula 1]

wherein $R_1$ and $R_2$ are each independently a $C_1$ to $C_5$ alkyl group; $R_3$ and $R_4$ are each independently a $C_2$ to $C_{15}$ alkylene group; $A_1$ and $A_2$ are each independently a glycidoxy group, an epoxy group, or a dialkoxyaryl group; and n ranges from about 10 to about 80 on average.

In exemplary embodiments, the (meth)acrylic resin may include a homopolymer of methyl (meth)acrylate, a copolymer of methyl acrylate and methyl methacrylate, or a copolymer of methyl (meth)acrylate and a comonomer including at least one of ethyl (meth)acrylate, propyl (meth)acrylate, butyl (meth)acrylate, phenyl (meth)acrylate and styrene.

In exemplary embodiments, the aromatic vinyl resin may include a rubber-modified aromatic vinyl-based copolymer resin including at least one of an acrylonitrile-butadiene-styrene copolymer resin (ABS resin), an acrylonitrile-ethylene propylene rubber-styrene copolymer resin (AES resin), and an acrylonitrile-acryl rubber-styrene copolymer resin (AAS resin).

In exemplary embodiments, the thermoplastic resin may include about 10 wt % to about 90 wt % of the (meth)acrylic resin and about 10% by weight (wt %) to about 90 wt % of the aromatic vinyl resin.

In exemplary embodiments, the siloxane compound may be present in an amount of about 0.1 parts by weight to about 10 parts by weight relative to about 100 parts by weight of the thermoplastic resin.

In exemplary embodiments, in the siloxane compound represented by Formula 1, $A_1$ and $A_2$ may be dialkoxyaryl groups and n may range from about 30 to about 40 on average.

In exemplary embodiments, the siloxane compound may include at least one of a compound represented by Formula 1a, a compound represented by Formula 1b, a compound represented by Formula 1c, and a compound represented by Formula 1d:

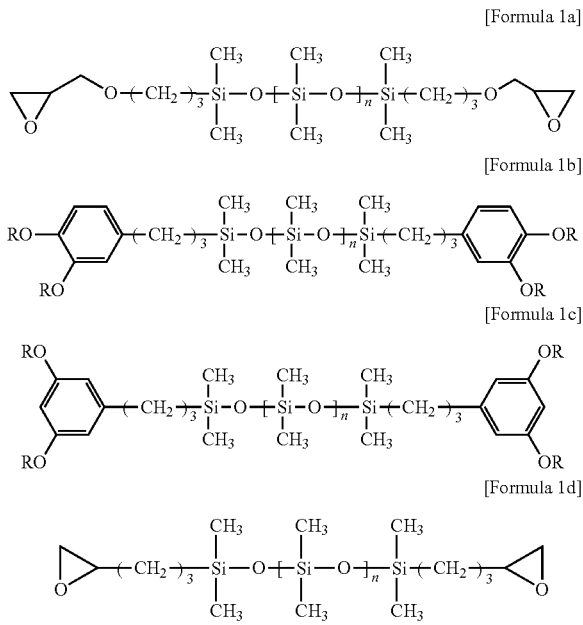

[Formula 1a]
[Formula 1b]
[Formula 1c]
[Formula 1d]

wherein n ranges from about 20 to about 60 on average and each R is independently a $C_1$ to $C_{10}$ alkyl group.

In exemplary embodiments, the thermoplastic resin composition may further include hydrophobically surface-modified silica.

In exemplary embodiments, the hydrophobically surface-modified silica may be obtained by substitution of a hydroxyl group on a surface of silica with a hydrophobic group including at least one of a $C_1$ to $C_8$ alkyl group and a silane compound.

In exemplary embodiments, the hydrophobically surface-modified silica may be present in an amount of about 0.1 to about 5 parts by weight relative to about 100 parts by weight of the thermoplastic resin.

In exemplary embodiments, the thermoplastic resin composition may have a difference in specular gloss at about 60° (ΔGloss (60°)) of about 16 or less, as measured on a specimen having a size of about 10 cm×about 15 cm using a crockmeter in accordance with ASTM D523 before and after rubbing about 10 times using a white cotton cloth.

In exemplary embodiments, the thermoplastic resin composition may have an Izod impact strength of about 3 kgf·cm/cm to about 15 kgf·cm/cm as measured on an about ⅛" thick specimen in accordance with ASTM D256, a melt flow index (MI) of about 10 g/10 min to about 30 g/10 min as measured at about 300° C. under a load of about 1.2 kgf in accordance with ASTM D1238, a Vicat softening temperature (VST) of about 90° C. to about 110° C. as measured under a load of about 5 kgf in accordance with ASTM D1525, and a scratch width of about 180 μm to about 250 μm, as measured by a ball type scratch profile test.

Another aspect of the present invention relates to a molded product formed of the thermoplastic resin composition.

Advantageous Effects

The present invention provides a thermoplastic resin composition that includes a specific siloxane compound and silica to exhibit good properties in terms of impact resistance, thermal resistance, scratch resistance, surface gloss, mar resistance, and the like, and a molded product including the same.

DESCRIPTION OF DRAWINGS

FIG. 1 shows a $^1$H-NMR spectrum of a siloxane compound represented by Formula 1a according to one embodiment of the present invention.

FIG. 2 shows a $^1$H-NMR spectrum of a siloxane compound represented by Formula 2 according to one embodiment of the present invention.

FIG. 3 shows a $^1$H-NMR spectrum of a siloxane compound represented by Formula 1b according to one embodiment of the present invention.

FIG. 4 shows a $^1$H-NMR spectrum of a siloxane compound represented by Formula 1c according to one embodiment of the present invention.

BEST MODE

Hereinafter, embodiments of the present invention will be described in detail.

A thermoplastic resin composition according to the present invention includes a thermoplastic resin including a (meth)acrylic resin and an aromatic vinyl resin, and a siloxane compound having functional groups at both terminals thereof.

Unless otherwise stated, the term "(meth)acryl" means both "acryl" and "methacryl". For example, "(meth)acrylate" means both "acrylate" and "methacrylate".

According to the present invention, the (meth)acrylic resin may be a typical (meth)acrylic resin used for the thermoplastic resin composition. For example, the (meth) acrylic resin may include a polymer of methyl (meth) acrylate (homopolymer of methyl (meth)acrylate and/or copolymer of methyl acrylate and methyl methacrylate), or a copolymer of methyl (meth)acrylate and a comonomer. Examples of the comonomer that can be copolymerized with methyl (meth)acrylate may include ethyl (meth)acrylate, propyl (meth)acrylate, butyl (meth)acrylate, phenyl (meth) acrylate, styrene, and mixtures thereof, without being limited thereto.

In exemplary embodiments, the (meth) acrylic resin may be prepared by a typical polymerization method, such as bulk polymerization, emulsion polymerization, suspension polymerization, and the like. For example, the (meth) acrylic resin may be prepared by adding a polymerization initiator to methyl (meth)acrylate or to methyl (meth)acrylate and a comonomer. Specifically, the polymerization initiator is a radical polymerization initiator and polymerization may be suspension polymerization performed in consideration of an index of refraction. Here, suspension polymerization may be performed in the presence of a suspension stabilizer and a chain transfer agent. That is, the (meth)acrylic resin according to the present invention can be prepared (through suspension polymerization) by adding a radical polymerization initiator and a chain transfer agent to the monomer to prepare a reaction mixture, followed by introducing the reaction mixture into an aqueous solution in which a suspension stabilizer is dissolved. Here, additives such as a surfactant, a nucleation agent, a coupling agent, a plasticizer, an impact modifier, a lubricant, an antibacterial agent, a release agent, an antioxidant, a heat stabilizer, a light stabilizer, and a compatibilizer may be further added.

In exemplary embodiments, when the (meth)acrylic resin is a copolymer of methyl (meth)acrylate with the comonomer, methyl (meth)acrylate may be present in an amount of about 50 wt % to about 99 wt %, for example, about 60 wt % to about 90 wt %, and the comonomer may be present in an amount of about 1 wt % to about 50 wt %, for example, about 10 wt % to about 40 wt %, without being limited thereto. Within this range, the thermoplastic resin can exhibit good properties in terms of scratch resistance, weather resistance, and the like.

In exemplary embodiments, the (meth)acrylic resin may have a weight average molecular weight (Mw) of about 70,000 g/mol to about 125,000 g/mol, for example, about 100,000 g/mol to about 120,000 g/mol, as measured by GPC (gel permeation chromatography). Within this range, the thermoplastic resin composition can have good properties in terms of scratch resistance, processability, and the like.

In exemplary embodiments, the (meth)acrylic resin may be present in an amount of about 10 wt % to about 90 wt %, for example, about 20 wt % to about 80 wt %, specifically about 30 wt % to about 70 wt %, based on the total amount of the thermoplastic resin. Within this range, the thermoplastic resin composition can have good properties in terms of scratch resistance, transparency, weather resistance, mechanical strength, surface gloss, processability, and the like.

According to the present invention, the aromatic vinyl resin may be, for example, a polymer (aromatic vinyl polymer resin) of an aromatic vinyl monomer, a copolymer (aromatic vinyl copolymer resin) of an aromatic vinyl monomer and a monomer copolymerizable with the same, or a rubber-modified aromatic vinyl-based copolymer resin in which rubbery polymer particles are dispersed in a matrix (continuous phase) composed of the aromatic vinyl (co)polymer resin.

In exemplary embodiments, the rubber-modified aromatic vinyl-based copolymer resin may be prepared by adding an aromatic vinyl monomer and, optionally, a monomer copolymerizable with the aromatic vinyl monomer to the rubbery polymer.

Generally, the rubber-modified aromatic vinyl-based copolymer resin may be prepared by a typical polymerization method, such as emulsion polymerization, suspension polymerization, bulk polymerization, and the like, and may be prepared by way of, for example, mixing and extrusion typically using a graft copolymer resin alone or a mixture of the graft copolymer resin and the aromatic vinyl copolymer resin. Here, when a blend of the graft copolymer resin and the aromatic vinyl copolymer resin is used, it is desirable that the graft copolymer resin and the aromatic vinyl copolymer resin be blended in consideration of compatibility thereof. Further, in bulk polymerization, the rubber-modified aromatic vinyl-based copolymer resin may be prepared through a one-stage process instead of separately preparing the graft copolymer resin and the aromatic vinyl copolymer resin. In any case, however, in the final rubber-modified aromatic vinyl-based copolymer resin, the rubber content (rubbery polymer) may be present in an amount of about 5 wt % to about 50 wt %. Further, the rubber may have a Z-average particle size of about 0.05 μm to about 6 μm. Within this range, the aromatic vinyl resin can exhibit good properties including impact resistance.

In exemplary embodiments, the graft copolymer resin may be obtained by grafting the aromatic vinyl monomer and the monomer copolymerizable with the aromatic vinyl monomer to the rubbery polymer, and may further include monomers for imparting processability and thermal resistance, as needed.

Examples of the rubbery polymer may include diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); and ethylene-propylene-diene monomer terpolymers (EPDM), without being limited thereto. Particularly, the rubbery polymer may be a diene rubber, specifically a butadiene rubber. The rubbery polymer may be present in an amount of about 5 wt % to about 95 wt %, for example, about 10 wt % to about 90 wt %, specifically about 40 wt % to about 90 wt %, based on the total amount of the graft copolymer resin. Within this range, the thermoplastic resin composition can have good balance between impact resistance and mechanical properties. The rubbery polymer (rubber particles) may have an average (z-average) particle size of about 0.05 μm to about 6 μm, for example, about 0.15 μm to about 4 μm, specifically about 0.25 μm to about 3.5 μm. Within this range, the thermoplastic resin composition can have good properties in terms of impact resistance and appearance.

The aromatic vinyl monomer is graft-copolymerizable with the rubbery copolymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinylnaphthalene, without being limited thereto. Specifically, the aromatic vinyl monomer may be styrene. The aromatic vinyl monomer may be present in an amount of about 5 wt % to about 90 wt %, for example, about 20 wt % to about 80 wt %, specifically about 30 wt % to about 60 wt %, based on the total amount of the graft copolymer resin. Within this range, the thermoplastic resin composition can have good balance between impact resistance and mechanical properties.

Examples of the monomer copolymerizable with the aromatic vinyl monomer may include vinyl cyanide compounds, such as acrylonitrile, methacrylonitrile, or ethacrylonitrile, and these monomers may be used alone or as a mixture thereof. The monomer copolymerizable with the aromatic vinyl monomer may be present in an amount of about 1 wt % to about 50 wt %, for example, about 5 to about 45 wt %, specifically about 10 to about 30 wt %, based on the total amount of the graft copolymer resin. Within this range, the thermoplastic resin composition can have good balance between impact resistance and mechanical properties.

Examples of the monomer for imparting processability and thermal resistance may include (meth)acrylic acid, $C_1$ to $C_{10}$ alkyl (meth)acrylates, maleic anhydride, and N-substituted maleimide, without being limited thereto. The monomer for imparting processability and thermal resistance may be present in an amount of about 15 wt % or less, for example, about 0.1 wt % to about 10 wt %, based on the total amount of the graft copolymer resin. Within this range, the monomer can impart processability and thermal resistance without deterioration in other properties.

In exemplary embodiments, the aromatic vinyl (co)polymer resin may be prepared using a monomer mixture excluding the rubber component (rubbery polymer) of the graft copolymer resin, and the ratio of monomers may differ according to compatibility. For example, the aromatic vinyl (co)polymer resin may be obtained through polymerization of the aromatic vinyl monomer alone, or through copolymerization of the aromatic vinyl monomer with the monomer copolymerizable with the aromatic vinyl monomer and/or the monomer for imparting processability and thermal resistance.

In the aromatic vinyl copolymer resin, the aromatic vinyl monomer may be present in an amount of about 10 wt % to about 99 wt %, for example, about 20 wt % to about 95 wt %, specifically about 20 wt % to about 80 wt %, based on the total amount of the aromatic vinyl copolymer resin. Within this range, the thermoplastic resin composition can have good balance between impact resistance and mechanical properties.

The monomer copolymerizable with the aromatic vinyl monomer may be present in an amount of about 1 wt % to about 90 wt %, for example, about 5 wt % to about 80 wt %, specifically about 20 wt % to about 80 wt %, based on the total amount of the aromatic vinyl copolymer resin. Within this range, the thermoplastic resin composition can have good balance between impact resistance and mechanical properties.

In addition, the monomer for imparting processability and thermal resistance may be present in an amount of about 80 wt % or less, for example, about 0.1 wt % to about 75 wt %, based on the total amount of the aromatic vinyl copolymer resin. Within this range, the monomer can impart processability and thermal resistance without deterioration in other properties.

In exemplary embodiments, the aromatic vinyl (co)polymer resin may have a weight average molecular weight of about 10,000 g/mol to about 50,000 g/mol, as measured by GPC, without being limited thereto.

In exemplary embodiments, examples of the rubber-modified aromatic vinyl-based copolymer resin may include an acrylonitrile-butadiene-styrene copolymer resin (ABS resin), an acrylonitrile-ethylene/propylene rubber-styrene copolymer resin (AES resin), and an acrylonitrile-acryl rubber-styrene copolymer resin (AAS resin), without being limited thereto. Here, in the ABS resin, a copolymer (g-ABS) corresponding to the graft copolymer resin and obtained by grafting a styrene monomer corresponding to an aromatic vinyl compound and an acrylonitrile monomer corresponding to an unsaturated nitrile compound to a butadiene rubber polymer core is dispersed in a styrene-acrylonitrile copolymer resin (SAN resin) and/or a methyl methacrylate-styrene-acrylonitrile copolymer resin (MSAN resin) corresponding to the aromatic vinyl copolymer resin.

In the rubber-modified aromatic vinyl-based copolymer resin, the graft copolymer resin may be present in an amount of about 10 wt % to about 100 wt %, for example, about 15 wt % to about 90 wt %, and the aromatic vinyl copolymer resin may be present in an amount of about 0 to about 90 wt %, for example, about 10 wt % to about 85 wt %. Within this range, the thermoplastic resin composition can have good property balance between impact resistance and mechanical properties.

In exemplary embodiments, the aromatic vinyl resin may be present in an amount of about 10 wt % to about 90 wt %, for example, about 20 wt % to about 80 wt %, specifically about 30 wt % to about 70 wt %, in the thermoplastic resin. Within this range, the thermoplastic resin composition can exhibit good properties in terms of impact resistance, thermal resistance, and the like.

In exemplary embodiments, the thermoplastic resin according to the present invention may further include a typical thermoplastic resin such as a polycarbonate resin, a polyester resin, a polyphenylene ether resin, a polyamide resin, and a polyolefin resin, within a range not causing deterioration in properties thereof. In addition, a typical crystalline polymer such as polyketone and polyoxymethylene oxide may be used together, as needed.

According to the present invention, the siloxane compound can improve mar resistance by reducing a coefficient of surface friction of the thermoplastic resin composition (specimen). For example, the siloxane compound may be represented by Formula 1.

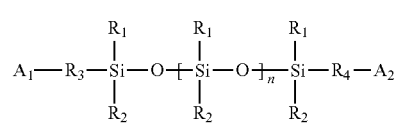

[Formula 1]

wherein $R_1$ and $R_2$ may be each independently a $C_1$ to $C_5$ alkyl group, for example, a methyl group, an ethyl group, a propyl group, and a butyl group, specifically a methyl group. $R_3$ and $R_4$ may be each independently a $C_2$ to $C_{15}$ alkylene group, for example, an ethylene group, a propylene group, a butylene group, a pentyl group, a hexylene group, and the like. $A_1$ and $A_2$ may be each independently a glycidoxy group, an epoxy group, or a dialkoxyaryl group. n may range from about 10 to about 80, for example, from about 20 to about 60, on average.

In exemplary embodiments, the siloxane compound represented by Formula 1 may be a siloxane compound in which $A_1$ and $A_2$ are dialkoxyaryl groups and n ranges from about 30 to about 40 on average. Further, the siloxane compound may have a weight average molecular weight of about 2,500 g/mol to about 4,000 g/mol and a polydispersity index (PDI) of about 1.5 to about 2.5.

In exemplary embodiments, the siloxane compound may be prepared by reacting a compound (functional group) represented by Formula 3 with a siloxane compound represented by Formula 2 (precursor).

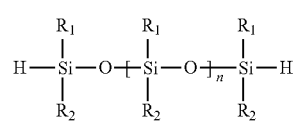

[Formula 2]

wherein $R_1$, $R_2$ and an average value of n are the same as defined in Formula 1.

The siloxane compound of Formula 2 may be prepared by adjusting the n value through reaction of linear siloxane in which n is 0 and cyclic siloxane, without being limited thereto.

$A_3$-$R_5$     [Formula 3]

wherein $A_3$ is a glycidoxy group, an epoxy group, or a dialkoxyaryl group, and $R_5$ is a $C_2$ to $C_{15}$ hydrocarbon group having a double-bond terminal, for example, a vinyl group ($CH_2$=$CH$—), an aryl group ($CH_2$=$CH$—$CH_2$—), and the like.

As the compound represented by Formula 3, a compound in which $A_3$ and $R_5$ are different functional groups, and, after reaction, $A_3$ and $R_5$ may represent $A_1$ and $A_2$ and $R_3$ and $R_4$ of the siloxane compound represented by Formula 1, respectively.

In exemplary embodiments, the reaction may be carried out in the presence of a catalyst. The catalyst may be a platinum-containing catalyst. For example, the catalyst may be platinum or a platinum-containing compound, specifically, $H_2PtCl_6$, $Pt_2\{[(CH_2=CH)Me_2Si]_2O\}_3$, $Rh[(cod)_2]BF_4$, $Rh(PPh_3)_4Cl$, Pt/C, and mixtures thereof, without being limited thereto. More specifically, the catalyst may be Pt/C, for example, 10% Pt/C. The catalyst may be added in an amount of, for example, about 10 ppm to about 500 ppm, for example, about 50 ppm to about 150 ppm, based on the total amount of the reactant.

Reaction may be carried out in the presence of an organic solvent. Examples of the organic solvent may include 1,2-dichloroethane, toluene, xylene, dichlorobenzene, and mixtures thereof, without being limited thereto. For example, toluene may be used as the organic solvent for reaction.

In addition, temperature and time for reaction may be adjusted depending upon reactivity of reactants (Formula 2 and Formula 3). For example, reaction may be performed at a temperature of about 60° C. to about 140° C., specifically about 110° C. to about 120° C., for about 2 hours to about 12 hours, for example, about 3 hours to about 5 hours, without being limited thereto.

In exemplary embodiments, the siloxane compound may be represented by Formulae 1a to 1d, without being limited thereto.

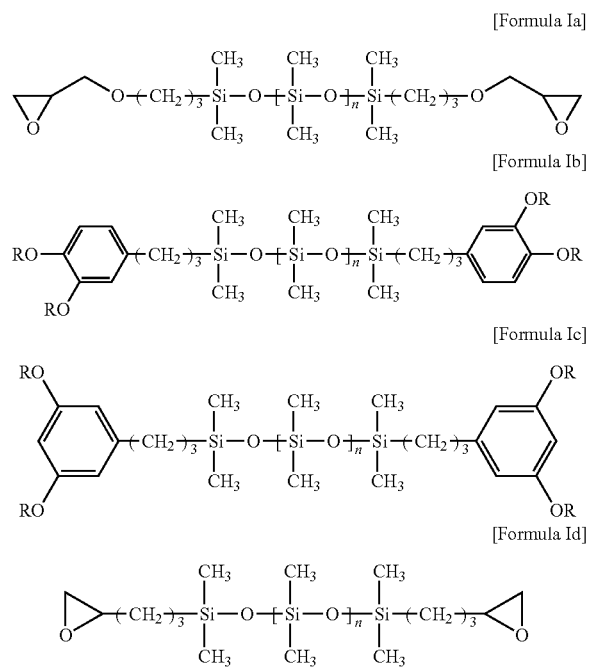

[Formula Ia]

[Formula Ib]

[Formula Ic]

[Formula Id]

wherein n ranges on average from about 10 to about 80, for example, from about 20 to about 60, specifically from about 30 to about 40, and each R is independently a $C_1$ to $C_{10}$ alkyl group.

In exemplary embodiments, the siloxane compound may be present in an amount of about 0.1 to about 10 parts by weight, for example, about 0.2 to about 3 parts by weight, specifically about 0.3 to about 2 parts by weight, relative to about 100 parts by weight of the thermoplastic resin. Within this range of the siloxane compound, the thermoplastic resin composition can exhibit good properties in terms of impact resistance, thermal resistance, scratch resistance, mar resistance, colorability, appearance characteristics (surface gloss and the like), and balance therebetween.

In exemplary embodiments, the thermoplastic resin may further include hydrophobically surface-modified silica. The hydrophobically surface-modified silica can serve to improve color difference (surface gloss) through regulation of the index of refraction of the thermoplastic resin composition and may be selected from any typical hydrophobically surface-modified silica commercially available in the art. For example, the hydrophobically surface-modified silica may be obtained by substitution of at least one hydroxyl group on the surface of silica with a hydrophobic group including a $C_1$ to $C_8$ alkyl group or a silane compound such as polydimethylsiloxane (PDMS).

In exemplary embodiments, the hydrophobically surface-modified silica may have an average particle size of about 40 nm or less, for example, about 10 nm to about 20 nm and a BET surface area of about 90 $m^2/g$ to about 290 $m^2/g$, for example, about 100 $m^2/g$ to about 200 $m^2/g$, without being limited thereto.

In exemplary embodiments, the hydrophobically surface-modified silica may be present in an amount of about 0.1 to about 5 parts by weight, for example, about 0.2 to about 3 parts by weight, specifically about 0.3 to about 2 parts by weight, relative to about 100 parts by weight of the thermoplastic resin. Within this range, the thermoplastic resin composition can exhibit further improved properties in terms of color difference (surface gloss) and the like.

In exemplary embodiments, in use of the siloxane compound, the siloxane compound and the hydrophobically surface-modified silica may be present in a weight ratio (siloxane compound: silica) of about 1:0.5 to about 1:1.5, for example, about 1:0.7 to about 1:1.3. Within this range, the thermoplastic resin composition can exhibit further improved properties in terms of scratch resistance, appearance characteristics (surface gloss, colorability, and the like), mar resistance, and the like.

In addition, the thermoplastic resin composition according to the present invention may further include typical additives such as flame retardants, flame retardant aids, lubricants, plasticizers, heat stabilizers, dripping inhibitors, antioxidants, light stabilizers, pigments, dyes, and the like. These may be used alone or in combination thereof. For example, the additives may be present in an amount of about 0.1 to about 10 parts by weight relative to about 100 parts by weight of the thermoplastic resin, without being limited thereto.

The thermoplastic resin composition according to the present invention may be prepared in pellet form by mixing the above components, followed by melt extrusion of the mixture at about 200° C. to about 280° C., for example, at about 250° C. to about 260° C., through a typical twin-screw extruder.

The pellet can be produced into various molded products through various molding methods such as injection molding, extrusion molding, vacuum molding, casting, and the like. These molding methods are well known to a person having ordinary knowledge in the art.

In exemplary embodiments, the thermoplastic resin composition may have a difference in specular gloss at about 60° (ΔGloss (60°)) of about 16 or less (about 10 times), about 35 or less (about 50 times) and about 45 or less (about 100 times), for example, about 1 to about 10 (about 10 times), about 3 to about 30 (about 50 times) and about 5 to about 45 (about 100 times), as measured on a specimen having a size of about 10 cm×about 15 cm using a crockmeter in accordance with ASTM D523 before and after rubbing the specimen about 10 times, about 50 times and about 100 times using a white cotton cloth. A lower gloss difference indicates better mar resistance.

The thermoplastic resin composition may have an Izod impact strength of about 3 kgf·cm/cm to about 15 kgf·cm/cm, for example, about 5 kgf·cm/cm to about 10 kgf·cm/cm, as measured on an about ⅛" thick specimen in accordance with ASTM D256.

The thermoplastic resin composition may have a melt flow index (MI) of about 10 g/10 min to about 30 g/10 min, for example, about 14 g/10 min to about 27 g/10 min, as measured at about 300° C. under a load of about 1.2 kgf in accordance with ASTM D1238.

The thermoplastic resin composition may have a Vicat softening temperature (VST) of about 90° C. to about 110° C., for example, about 95° C. to about 105° C., as measured under a load of about 5 kgf in accordance with ASTM D1525.

The thermoplastic resin composition may have a scratch width of about 180 μm to about 250 μm, for example, about 200 μm to about 245 μm, as measured by a ball type scratch profile test.

In addition, the thermoplastic resin composition may have a specular component-included (SCI) reflectance (L* measurement) of about 25 to about 30, for example, about 26 to about 28, and a specular component-excluded (SCE) reflectance (L* measurement) of about 3 to about 12, for example, about 3.2 to about 7, as measured on a specimen having a size of about 10 cm×about 15 cm using a colorimeter.

A molded product according to the present invention is produced from the thermoplastic resin composition by various molding methods, has good properties in terms of impact resistance, thermal resistance, scratch resistance, mar resistance, colorability, appearance characteristics, and the like, and thus can be advantageously applied to interior/exterior materials of electric/electronic products and automobiles.

Mode For Invention

Hereinafter, the present invention will be described in more detail with reference to some examples. It should be understood that these examples are provided for illustration only and are not to be construed in any way as limiting the present invention. Descriptions of details apparent to those skilled in the art will be omitted for clarity.

EXAMPLE

Details of components used in the following Examples and Comparative Examples are as follows.

(A) Thermoplastic Resin (A1) (Meth)acrylic resin: Poly(methyl methacrylate) (PMMA, Samsung SDI, Product name: PM-7200, weight average molecular weight: 115,000 g/mol) was used.

(A2) Aromatic vinyl resin: A rubber-modified aromatic vinyl-based copolymer resin (ABS resin) prepared by kneading 16.7 wt % of the following graft copolymer resin (g-ABS) and 83.3 wt % of the following SAN resin was used.

(A3) aromatic vinyl resin: A rubber-modified aromatic vinyl-based copolymer resin (ABS resin) prepared by kneading 20.6 wt % of the following graft copolymer resin (g-ABS) and 79.4 wt % of the following SAN resin was used.

(A4) aromatic vinyl resin: A rubber-modified aromatic vinyl-based copolymer resin (ABS resin) prepared by kneading 20 wt % of the following graft copolymer resin (g-ABS), 60 wt % of the following SAN resin and 20 wt % of the following MSAN resin was used.

*graft copolymer resin (g-ABS): g-ABS prepared by grafting 52 wt % of a styrene monomer and acrylonitrile (weight ratio (SM/AN): 73/27) to 48 wt % of polybutadiene rubber (PBR) having a Z-average of 310 nm.

*SAN resin: Styrene-acrylonitrile copolymer (weight ratio (SM/AN): 76/24, weight average molecular weight: 150,000 g/mol).

*MSAN resin: Methyl methacrylate-styrene-acrylonitrile copolymer (weight ratio (MMA/SM/AN): 74/21/5, weight average molecular weight: 150,000 g/mol).

(B) Siloxane compound (B1) With tetramethyldisiloxane (HMM) and octamethylcyclotetrasiloxane placed in a mole ratio of 1:4 in a flask, trifluoromethanesulfonic acid was added thereto at 0° C., followed by reaction at 20° C. to 30° C. for 24 hours to prepare a siloxane compound ($R_1$=methyl group, n=20 on average) represented by Formula 2. Then, the siloxane compound represented by Formula 2 and allyl glycidyl ether were provided in a mole ratio of 1:2.5 to toluene (100 parts by weight relative to 100 parts by weight of the siloxane compound represented by Formula 2 and allyl glycidyl ether (reactants)), and 50 ppm of a platinum catalyst (with reference to reactant weight) was added thereto, followed by reaction at 90° C. for 7 hours, thereby preparing a siloxane compound represented by Formula 1a (n=20 on average). $^1$H-NMR spectra of the siloxane compound represented by Formula 1a and the siloxane compound represented by Formula 2 are shown in FIG. 1 and FIG. 2.

[Formula 1a]

$$\underset{O}{\overset{}{\triangle}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!}$$

$$\text{O}-(\text{CH}_2)_3-\underset{\underset{\text{CH}_3}{|}}{\overset{\overset{\text{CH}_3}{|}}{\text{Si}}}-\text{O}-[\underset{\underset{\text{CH}_3}{|}}{\overset{\overset{\text{CH}_3}{|}}{\text{Si}}}-\text{O}]_n-\underset{\underset{\text{CH}_3}{|}}{\overset{\overset{\text{CH}_3}{|}}{\text{Si}}}-(\text{CH}_2)_3-\text{O}\underset{O}{\overset{}{\triangle}}$$

[Formula 2]

$$\text{H}-\underset{\underset{R_2}{|}}{\overset{\overset{R_1}{|}}{\text{Si}}}-\text{O}-[\underset{\underset{R_2}{|}}{\overset{\overset{R_1}{|}}{\text{Si}}}-\text{O}]_n-\underset{\underset{R_2}{|}}{\overset{\overset{R_1}{|}}{\text{Si}}}-\text{H}$$

(B2) With tetramethyldisiloxane (HMM) and octamethylcyclotetrasiloxane placed in a mole ratio of 1:10 in a flask, trifluoromethanesulfonic acid was added thereto at 0° C., followed by reaction at 20° C. to 30° C. for 24 hours to prepare a siloxane compound ($R_1$=methyl group, n=50 on average) represented by Formula 2. Then, the siloxane compound represented by Formula 2 and allyl glycidyl ether were provided in a mole ratio of 1:2.5 to toluene (100 parts by weight relative to 100 parts by weight of the siloxane compound represented by Formula 2 and allyl glycidyl ether (reactants)), and 50 ppm of a platinum catalyst (with reference to reactant weight) was added thereto, followed by reaction at 90° C. for 7 hours, thereby preparing a siloxane compound represented by Formula 1a (n=50 on average).

(B3) The following siloxane compound represented by Formula 1b (R=methyl group, n=20 on average) was prepared by the same method as in (B1) except that 1,2-dimethoxy-4-vinylbenzene was used instead of allyl glycidyl ether. A $^1$H-NMR spectrum of the siloxane compound represented by Formula 1b is shown in FIG. 3.

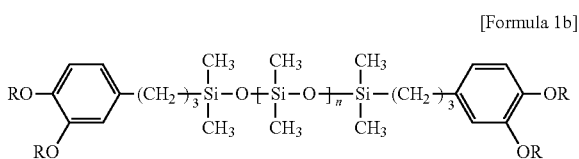

[Formula 1b]

(B4) The following siloxane compound represented by Formula 1b (R=methyl group, n=50 on average) was prepared by the same method as in (B2) except that 1,2-dimethoxy-4-vinylbenzene was used instead of allyl glycidyl ether.

(B5) With tetramethyldisiloxane (HMM) and octamethylcyclotetrasiloxane placed in a mole ratio of 1:7 in a flask, trifluoromethanesulfonic acid was added thereto at 0° C., followed by reaction at 20° C. to 30° C. for 24 hours to prepare a siloxane compound ($R_1$=methyl group, n=40 on average) represented by Formula 2. Then, the siloxane compound represented by Formula 2 and 1,3-dimethoxy-5-vinylbenzene were provided in a mole ratio of 1:2.5 to toluene (100 parts by weight relative to 100 parts by weight of the siloxane compound represented by Formula 2 and allyl glycidyl ether (reactants)), and 50 ppm of a platinum catalyst (with reference to reactant weight) was added thereto, followed by reaction at 90° C. for 7 hours, thereby preparing a siloxane compound represented by Formula 1c (n=40 on average). A $^1$H-NMR spectrum of the prepared siloxane compound represented by Formula 1c is shown in FIG. 4.

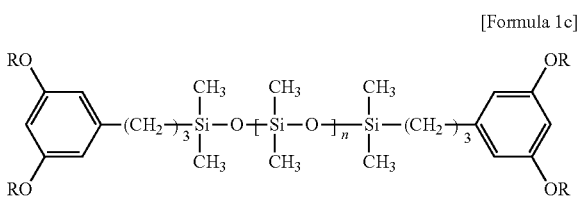

[Formula 1c]

(B6) With tetramethyldisiloxane (HMM) and octamethylcyclotetrasiloxane placed in a mole ratio of 1:6 in a flask, trifluoromethanesulfonic acid was added thereto at 0° C., followed by reaction at 20° C. to 30° C. for 24 hours to prepare a siloxane compound ($R_1$=methyl group, n=35 on average) represented by Formula 2. Then, the siloxane compound (n=35 on average) represented by Formula 2 and 1,2-dimethoxy-4-vinylbenzene were provided in a mole ratio of 1:2.5 to toluene (100 parts by weight relative to 100 parts by weight of the siloxane compound represented by Formula 2 and 1,2-dimethoxy-4-vinylbenzene (reactants)), and 50 ppm of a platinum catalyst (with reference to reactant weight) was added thereto, followed by reaction at 90° C. for 7 hours, thereby preparing a siloxane compound represented by Formula 1b (n=35 on average).

(B7) Polysiloxane (Evonik, Product Name: Tegomer H-Si 6440) modified with polyester was used.

(C) Hydrophobically surface-modified silica: Silica (Evonik, Product Name: Aerosil R 972) subjected to surface modification (substitution) with a methyl group was used.

Examples 1 to 15 and Comparative Examples 1 to 3

The aforementioned components were added in amounts as listed in Tables 1, 2 and 3, followed by extrusion at 200° C. to 280° C. to prepare pellets. Extrusion was performed using a twin-screw extruder (L/D=36, ϕ 45 mm) and the prepared pellets were dried at 80° C. to 100° C. for 4 hours and subjected to injection molding in a molding machine (molding temperature: 290° C., mold temperature: 90° C.) to prepare specimens. The prepared specimens were evaluated as to the following properties and results are shown in Tables 1, 2 and 3.

Property Evaluation (1) Izod impact resistance: Izod impact strength (unit: kgf-cm/cm)) was measured on a ⅛" thick notched Izod specimen in accordance with ASTM D256.

(2) Flowability (processability): Melt flow index (MI) (unit: g/10 min)) was measured at 300° C. and a load of 1.2 kgf in accordance with ASTM D1238.

(3) Thermal resistance: Vicat Softening Temperature (VST) (unit: ° C.) was measured under a load of 5 kgf in accordance with ASTM D1525.

(4) Scratch resistance: Scratch resistance was measured by the ball type scratch profile test. A scratch having a length of 10 mm to 20 mm was made on a surface of a specimen having a size of 90 mm×50 mm×2.5 mm under a load of 1 kg at a scratch speed of 75 mm/min using a spherical metal tip having a diameter of 0.7 mm. A profile of the scratch was scanned with a metal stylus tip having a diameter of 2 μm using a contact-type surface profile analyzer (XP-1, Ambios Technology), thereby measuring a scratch width (unit: m) as a measure of scratch resistance.

(5) Color difference: Specular component-included (SCI) reflectance (L* measurement) and specular component-excluded (SCE) reflectance (L* measurement) were measured on a specimen having a size of about 10 cm×about 15 cm using a colorimeter (MINOLTA, Device Name: CM-3600d).

(6) Mar resistance: Difference in specular gloss (ΔGloss (60°)) between before rubbing and after rubbing was calculated by measuring specular gloss at 600 on a specimen having a size of about 10 cm×about 15 cm using a crockmeter in accordance with ASTM D523 before and after rubbing the specimen about 10 times, about 50 times and about 100 times using a white cotton cloth.

TABLE 1

| | | Example | | | | | |
|---|---|---|---|---|---|---|---|
| | | 1 | 2 | 3 | 4 | 5 | 6 |
| (A) | (A1) (wt %) | 40 | 37 | 40 | 37 | 37 | 37 |
| | (A2) (wt %) | 60 | — | 60 | — | — | — |
| | (A3) (wt %) | — | 63 | — | 63 | 63 | 63 |
| (B) | (B1) (parts by weight) | 1.5 | 1.5 | — | — | — | — |
| | (B2) (parts by weight) | — | — | 1.5 | 0.5 | 1.0 | 1.5 |
| (C) (parts by weight) | | — | — | — | — | — | — |
| Izod impact resistance | | 4.9 | 4.9 | 5.1 | 5.8 | 4.9 | 5 |
| Melt flow index (MI) | | 15 | 25.7 | 14 | 22.5 | 24.6 | 26.2 |
| Vicat softening temperature | | 99.3 | 96.1 | 100.3 | 97 | 96 | 95.7 |
| Scratch width | | 231 | 241 | 225 | 242 | 231 | 228 |
| SCE | L* | 7.6 | 6.3 | 7.2 | 3.2 | 5.0 | 6.8 |
| SCI | L* | 27.3 | 27.1 | 27.3 | 26.1 | 26.7 | 27.2 |
| ΔGloss (60°) | 10 times | 12 | 13 | 4 | 11 | 8 | 6 |
| | 50 times | 25 | 25 | 11 | 18 | 15 | 13 |
| | 100 times | 42 | 29 | 17 | 29 | 25 | 22 |

Parts by weight: parts by weight relative to 100 parts by weight of thermoplastic resin (A)

TABLE 2

| | | Example | | | | | |
|---|---|---|---|---|---|---|---|
| | | 7 | 8 | 9 | 10 | 11 | 12 |
| (A) | (A1) (wt %) | 40 | 40 | 40 | 40 | 40 | 37 |
| | (A2) (wt %) | 60 | 60 | 60 | 60 | 60 | 63 |
| | (A3) (wt %) | — | — | — | — | — | — |
| (B) | (B1) (parts by weight) | 1.5 | — | — | — | — | — |
| | (B2) (parts by weight) | — | 1.5 | — | — | — | — |
| | (B3) (parts by weight) | — | — | 1.5 | — | — | — |
| | (B4) (parts by weight) | — | — | — | 1.5 | — | — |
| | (B4) (parts by weight) | — | — | — | — | 1.5 | 1.5 |
| | (C) (parts by weight) | — | — | — | — | — | — |
| | Izod impact resistance | 4.9 | 5.1 | 4.6 | 4.8 | 5.2 | 5.7 |
| | Melt flow index (MI) | 15 | 14 | 14 | 15 | 16 | 14 |
| | Vicat softening temperature | 96.3 | 96.1 | 97.1 | 99.4 | 98.4 | 97.8 |
| | Scratch width | 239 | 230 | 237 | 230 | 225 | 232 |
| SCE | L* | 7.6 | 7.7 | 7.3 | 7.4 | 7.0 | 6.8 |
| SCI | L* | 27.3 | 26.8 | 27.3 | 26.9 | 27.0 | 27.2 |
| ΔGloss (60°) | 10 times | 12 | 4 | 10 | 4 | 1 | 1 |
| | 50 times | 25 | 11 | 22 | 13 | 4 | 5 |
| | 100 times | 42 | 17 | 37 | 17 | 7 | 7 |

Parts by weight: parts by weight relative to 100 parts by weight of thermoplastic resin (A)

TABLE 3

| | | Example | | | Comparative Example | | |
|---|---|---|---|---|---|---|---|
| | | 13 | 14 | 15 | 1 | 2 | 3 |
| (A) | (A1) (wt %) | 40 | 37 | 70 | 40 | 37 | 40 |
| | (A2) (wt %) | 60 | — | — | 60 | — | 60 |
| | (A3) (wt %) | — | 63 | — | — | 63 | — |
| (B) | (B1) (parts by weight) | — | — | 30 | — | — | — |
| | (B2) (parts by weight) | 1.5 | 1.5 | — | — | — | — |
| | (B3) (parts by weight) | — | — | 2 | — | — | — |
| | (B4) (parts by weight) | — | — | — | — | — | 2 |
| | (C) (parts by weight) | 1.0 | 1.0 | — | — | — | 1.0 |
| | Izod impact resistance | 5.9 | 5.3 | 6.0 | 6.2 | 5.2 | 5.8 |
| | Melt flow index (MI) | 16 | 17 | 15.2 | 13.3 | 21.1 | 19.2 |
| | Vicat softening temperature | 97.2 | 96.5 | 96.8 | 100.1 | 92.2 | 94.5 |
| | Scratch width | 225 | 230 | 220 | 246 | 248 | 242 |
| SCE | L* | 5.4 | 5.6 | 5.0 | 2.4 | 4.5 | 4.7 |
| SCI | L* | 26.4 | 26.6 | 26.3 | 25.8 | 25.0 | 25.9 |
| ΔGloss (60°) | 10 times | 1 | 1 | 0.5 | 25 | 28 | 18 |
| | 50 times | 4 | 5 | 1 | 40 | 44 | 37 |
| | 100 times | 7 | 7 | 3 | 51 | 58 | 49 |

Parts by weight: parts by weight relative to 100 parts by weight of thermoplastic resin (A)

From the results, it can be seen that the thermoplastic resin compositions (Examples) according to the present invention exhibited good properties in terms of impact resistance, scratch resistance, flowability (processability), mar resistance, and balance therebetween.

Conversely, it can be seen that the thermoplastic resin composition of Comparative Examples prepared without using the siloxane compound of the present invention exhibited poorer mar resistance and scratch resistance than the thermoplastic resins of Examples.

It should be understood that various modifications, changes, alterations, and equivalent embodiments can be made by those skilled in the art without departing from the spirit and scope of the invention.

The invention claimed is:

1. A thermoplastic resin composition comprising:
   a thermoplastic resin comprising a (meth)acrylic resin and an aromatic vinyl resin; and
   a siloxane compound represented by Formula 1:

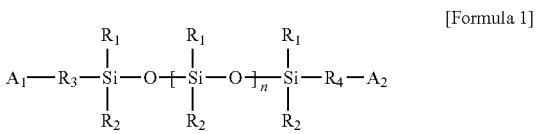

[Formula 1]

wherein $R_1$ and $R_2$ are each independently a $C_1$ to $C_5$ alkyl group; $R_3$ and $R_4$ are each independently a $C_2$ to $C_{15}$ alkylene group; $A_1$ and $A_2$ are each independently a glycidoxy group, an epoxy group, or a dialkoxyaryl group; and n ranges from about 10 to about 80 on average.

2. The thermoplastic resin composition according to claim 1, wherein the (meth)acrylic resin comprises a homopolymer of methyl (meth)acrylate, a copolymer of methyl acrylate and methyl methacrylate, or a copolymer of methyl (meth)acrylate and a comonomer comprising at least one of ethyl (meth)acrylate, propyl (meth)acrylate, butyl (meth)acrylate, phenyl (meth)acrylate and styrene.

3. The thermoplastic resin composition according to claim 1, wherein the aromatic vinyl resin comprises a rubber-modified aromatic vinyl-based copolymer resin comprising at least one of an acrylonitrile-butadiene-styrene copolymer resin (ABS resin), an acrylonitrile-ethylene propylene rubber-styrene copolymer resin (AES resin), and an acrylonitrile-acryl rubber-styrene copolymer resin (AAS resin).

4. The thermoplastic resin composition according to claim 1, wherein the thermoplastic resin comprises about 10 wt % to about 90 wt % of the (meth)acrylic resin and about 10 wt % to about 90 wt % of the aromatic vinyl resin.

5. The thermoplastic resin composition according to claim 1, wherein the siloxane compound is present in an amount of about 0.1 parts by weight to about 10 parts by weight relative to about 100 parts by weight of the thermoplastic resin.

6. The thermoplastic resin composition according to claim 1, wherein, in the siloxane compound represented by Formula 1, $A_1$ and $A_2$ are dialkoxyaryl groups and n ranges from about 30 to about 40 on average.

7. The thermoplastic resin composition according to claim 1, wherein the siloxane compound comprises at least one of a compound represented by Formula 1a, a compound represented by Formula 1b, a compound represented by Formula 1c, and a compound represented by Formula 1d:

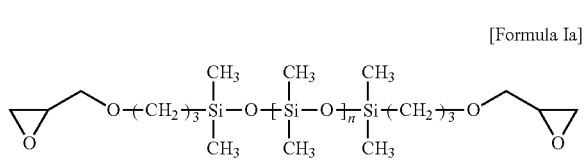

[Formula Ia]

[Formula Ib]

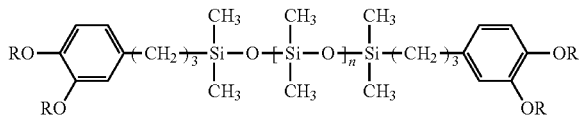

-continued

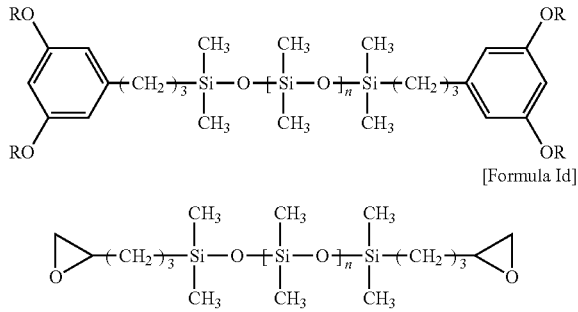

[Formula Ic]

[Formula Id]

wherein n ranges from about 20 to about 60 on average and each R is independently a $C_1$ to $C_{10}$ alkyl group.

8. The thermoplastic resin composition according to claim 1, wherein the thermoplastic resin composition further comprises a hydrophobically surface-modified silica.

9. The thermoplastic resin composition according to claim 8, wherein the hydrophobically surface-modified silica is obtained by substitution of a hydroxyl group on a surface of silica with a hydrophobic group including at least one of a $C_1$ to $C_8$ alkyl group and a silane compound.

10. The thermoplastic resin composition according to claim 8, wherein the hydrophobically surface-modified silica is present in an amount of about 0.1 to about 5 parts by weight relative to about 100 parts by weight of the thermoplastic resin.

11. The thermoplastic resin composition according to claim 1, wherein the thermoplastic resin composition has a difference in specular gloss at about 60° (ΔGloss (60°)) of about 16 or less, as measured on a specimen having a size of about 10 cm ×about 15 cm using a crockmeter in accordance with ASTM D523 before and after rubbing about 10 times using a white cotton cloth.

12. The thermoplastic resin composition according to claim 1, wherein the thermoplastic resin composition has an Izod impact strength of about 3 kgf·cm/cm to about 15kgf·cm/cm as measured on an about ⅛" thick specimen in accordance with ASTM D256, a melt flow index (MI) of about 10 g/10 min to about 30 g/10 min as measured at about 300° C. under a load of about 1.2 kgf in accordance with ASTM D1238, a Vicat softening temperature (VST) of about 90° C. to about 110° C. as measured under a load of about 5 kgf in accordance with ASTM D1525, and a scratch width of about 180 μm to about 250 μm, as measured by a ball type scratch profile test.

13. A molded product formed of the thermoplastic resin composition according to claim 1.

* * * * *